United States Patent
Brian et al.

[15] 3,673,087
[45] June 27, 1972

[54] PLANT TREATMENT COMPOSITION COMPRISING A PLANT TREATMENT CHEMICAL, A WETTING AGENT AND AN ALIPHATIC ALCOHOL

[72] Inventors: Robert Coles Brian; Peter Douglas Bland, both of Bracknell, England

[73] Assignee: Imperial Chemical Industries Limited, London, England

[22] Filed: Jan. 25, 1971

[21] Appl. No.: 109,636

Related U.S. Application Data

[63] Continuation of Ser. No. 691,143, Dec. 18, 1967, abandoned.

[30] Foreign Application Priority Data

Jan. 5, 1967  Great Britain ............................ 672/67

[52] U.S. Cl. ........................................ 252/1, 71/1
[51] Int. Cl. ................................ A01n 17/08, C09k 3/00
[58] Field of Search ........................ 252/1, 121, 351–357, 252/3, 8.1, 363.5; 71/1

[56] References Cited

UNITED STATES PATENTS

| | | | |
|---|---|---|---|
| 2,719,785 | 10/1955 | Johnson | 252/353 X |
| 2,819,996 | 1/1958 | Riley | 252/351 X |
| 2,872,368 | 2/1959 | Sanders | 252/353 X |
| 3,243,382 | 3/1966 | Johnson | 252/353 X |
| 3,294,703 | 12/1966 | Johnson | 252/353 |
| 3,342,581 | 9/1967 | Woodward | 252/353 X |
| 3,442,818 | 5/1969 | Johnson | 252/353 |

FOREIGN PATENTS OR APPLICATIONS 912,389  12/1962  Great Britain ........................ 252/142

*Primary Examiner*—Robert F. Burnett
*Assistant Examiner*—M. E. McCamish
*Attorney*—Cushman, Darby & Cushman

[57] ABSTRACT

Plant treatment compositions having improved wetting and spreading properties, containing a plant treatment chemical, a wetting agent selected from alkyl or alkyl aryl sulphonates or sulphates, or from condensates of ethylene oxide or propylene oxide with alcohols, amines or alkyl phenols; and an aliphatic compound having the molecular formula:

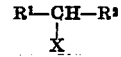

wherein X is —OH, —CO$_2$H, —NH$_2$, —CONH$_2$, or —O·CO·H, and wherein R$^1$ is a straight chain alkyl or alkoxyalkyl group having from four to 11 carbon atoms; R$^2$ is hydrogen or a straight chain alkyl or alkoxyalkyl group having from three to five carbon atoms and the total number of carbon atoms in the molecule is from 8 to 12 inclusive.

17 Claims, No Drawings

PLANT TREATMENT COMPOSITION COMPRISING A PLANT TREATMENT CHEMICAL, A WETTING AGENT AND AN ALIPHATIC ALCOHOL

This is a continuation of Ser. No. 691,143, filed Dec. 18, 1967, now abandoned.

This invention relates to compositions having improved wetting properties.

Chemicals are widely used today in farming and horticulture. Some of these, e.g. fertilizers, are generally applied to the soil; others are more usually applied to plant foliage. Thus pesticides of various kinds, e.g. fungicides, insecticides and nematicides may be applied to all crops; herbicides are applied to weeds in crops; defoliants are applied to various crops, e.g. potatoes, sugar cane and cotton before harvesting; growth promoting agents, e.g. gibberellins, are applied to certain types of crop to increase yield and to improve quality.

A large number of these chemicals are applied by spraying in the form of aqueous solutions or suspensions. It is generally desirable to cover all exposed parts of the crop with the spray; some chemicals may be transmitted through the plant to sites at which they are required, but generally the maximum possible coverage is best. To obtain the maximum possible coverage, it is best to spray very fine droplets. However, such droplets are prone to drift; they are carried away by the smallest air movement. Not only is this a waste of chemical, but in may cases the chemical may come to rest where it is not wanted. For example, contact herbicides being sprayed to kill weeds between rows of crops may be carried onto and damage the crops themselves. Therefore, the modern tendency is to use spraying devices which give larger spray droplets. Examples of such devices are vibrating or oscillating nozzles, such as those sold under the trademark 'VIBRAJET'. These devices greatly reduce drift, but accentuate the coverage problem. Large droplets tend to bounce off plant leaves without wetting them. Many plants have hairy surfaces which are extremely difficult to wet; water just runs off them.

It is known to use a variety of wetting agents in aqueous formulations of plant treatment chemicals but even these give only moderate results in wetting hairy leaves.

We have now discovered a method of formulating plant treatment chemicals in aqueous solution which can give a hitherto unknown degree of wetting; in favorable circumstances one large drop of a preferred formulation according to our invention landing on a hairy leaf will spontaneously spread all over it.

According to the present invention we provide a plant treatment composition substantially free of organic liquid diluent, and comprising:

A plant treatment chemical;
A wetting agent;
An aliphatic compound having the molecular formula:

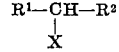

where—X is —OH, —COOH, —NH$_2$, —CONH$_2$, or —O·CO·H;

R$^1$ is a straight chain alkyl or alkoxyalkyl group having from four to 11 carbon atoms; R$^2$ is hydrogen or a straight chain alkyl or alkoxyalkyl group having from three to five carbon atoms and the total number of carbon atoms in the molecule is from 8 to 12 inclusive; and, optionally, Water.

The wetting agents used in the plant treatment compositions of our invention are selected from a. anionic wetters which are alkyl or alkyl aryl sulphates or sulphonates b. nonionic wetters which are condensates of ethylene oxide or propylene oxide with alcohols, amines or alkyl phenols. Wetters of these two types are well known and readily available commercially. Suitable anionic wetters include for example, sodium dodecyl benzene sulphonate and sodium lauryl sulphate; suitable non-ionic wetters include condensates of several e.g. from three to twelve) molar proportions of alkylene oxide or propylene oxide with o-or p-octyl phenol, o-or p-octyl cresol, o-or p-nonyl phenol, n-decanol or dodecylamine. Mixtures of any of the foregoing wetters may be used. Various suitable non-ionic wetters are commercially available under the trademarks 'LISSAPOL', 'LUBROL', 'ARYLAN', and 'ETHOMEEN'.

Examples of aliphatic compounds which may be used in our invention are n-decanoic acid, n-dodecanamide, n-undecanyl formate, n-heptyl formate, n-nonylamine and n-nonan-5-ol. It is preferred that the group R$^2$ is hydrogen or the same as the group R$^1$. Best results are obtained with acids and alcohols, particularly primary alcohols. Examples of preferred aliphatic compounds are n-octanoic acid, n-decanoic acid and 2-octyloxyethanol. Especially preferred are n-octan-1-ol, n-decan-1-ol and n-nonan-1-ol, particularly the latter. Mixtures of the aliphatic compounds may be used.

A very wide variety of plant treatment chemicals may be used to make plant treatment compositions according to the invention. The plant treatment chemical may be, inter alia, a fungicide, a herbicide, an insecticide, a defoliant or a growth promoting agent. Examples of suitable herbicides are:

| Chemical Name | Common Name |
| --- | --- |
| 4-chloro-2-methylphenoxyacetic acid (and salts and esters thereof) | M.C.P.A. |
| 2,4-dichlorophenoxyacetic acid (and salts and ester thereof) | 2,4–D. |
| 2-(4-chloro-2-methyl-phenoxy)propionic acid (and salts and esters thereof) | Mecoprop |
| 2-chloro-6-ethylamino-4-isopropylamino-1,3,5-triazine | Atrazine |
| 2-chloro-4,6-diethylamino-1,3,5-triazine | Simazine |
| 3-amino-1,2,4-triazole | Amitrol |
| 2,2-dichloropropionic acid (and salts and esters thereof) | Dalapon |
| N'-(3:4-dichlorophenyl)N,N-dimethyl urea | Diuron |
| N'-(4-chlorophenyl)N-methoxy-N-methyl urea | Monolinuron |
| 2-methyl 4,6-dinitrophenol | D.N.O.C. |
| ammonium sulphamate | |
| sodium chlorate | |

Particularly useful are the bipyridylium salt herbicides e.g. salts of the 1,1'-dimethyl-4,4,'-bipyridylium dication (common name paraquat) and the 1,1'-ethylene-2,2'-bipyridylium dication (common name diquat).

Example of suitable insecticides are :

| Chemical Name | Common Name |
| --- | --- |
| S-[1,2 di(ethoxycarbonyl)ethyl]-dimethyl phosphorothiolothionate | Malathion |
| diethyl p-nitrophenyl phosphorothionate | Parathion |
| 1,2,3,4,10,10-hexachloro-1,4,4a,5,8,8a-hexahydro-exo-1,4-endo-5,8-dimethanonaphthalene | Aldrin |
| dichlorodiphenyltrichloroethane | D.D.T. |
| benzene hexachloride, Y isomer | lindane |
| diethyl-2-(ethylthio)ethyl phosphorothionate mixed with diethyl S[(2-ethylthio)ethyl] phosphorothiolate | Demeton |
| 1-naphthyl N-methyl carbamate | Sevin |
| 2-methyl-2-methylthiopropionaldehyde-N-methyl carbamoyl oxime | Temik |

A particularly useful aphicide is S-(4,6-diamino-1,3,5-triazin-2-ylmethyl)dimethyl phosphorothiolothionate (common name menazon).

Examples of suitable fungicides are:

| Chemical Name | Common Name |
| --- | --- |

N-(trichloromethylthio)-cyclohex-4-

| | |
|---|---|
| ene-1,2-dicarboxyimide | Captan |
| manganese ethylene 1,2 bis-dithiocarbamate | Maneb |
| zinc ethylene-1,2 bisdithiocarbamate | Zineb |
| 2,3-dicyano-1,4-dihydro-1,4-dithio-anthraquinone | Dithianon |
| dodecylguanidine | Dodine |
| 4-(2-chlorophenylhydrazono)-3-methyl-5-isoxazolone | Drazoxolon |
| cuprous compounds | |

An example of a growth promoting agent is gibberellic acid.

Most conveniently, the plant treatment chemicals used in the present invention are water-soluble, like, for example the bipyridylium salts and sodium chlorate, and can be formulated as aqueous solutions. Solid water-insoluble chemicals may be formulated as finely divided suspensions; if desired the suspensions may be stabilized by addition of suspending agents, for example, bentonite. Examples of such chemicals are captan, zineb, monolinuron, diuron and cuprous oxide.

The concentration of the ingredients in our formulation will vary according to the use to which the formulation is to be put. If the formulation is to be applied to plants directly without further treatment, the concentration of both wetter and aliphatic compound is generally within the range of 0.01–2.0 percent, and conveniently within the range of 0.05–0.5 percent by weight of the composition. The concentration of active ingredient will vary widely according to the nature of the active ingredient and the purpose of the formulation, but it will generally be between 0.001 and 30 percent by weight and usually between 0.1 and 1 percent. The remainder of the composition is generally water. If, however, it is desirable to provide a concentrated formulation, then the composition will contain a reduced amount of water, e.g. from 10 to 15 percent of the combined weight of all the other ingredients, while keeping the relative proportions of all the other ingredients the same. If desired, the concentrated formulation may contain no water at all; instead, it may contain a solid diluent, for example silica or china clay. Concentrated formulations may be desired for application by aerial spraying; or for ease of transport, when they may be diluted by the farmer immediately before use.

In carrying out our invention the normal principles of formulation should be observed. Thus, antagonistic substances should not be mixed (for example, as is well known, it is preferable not to mix bipyridylium salts with anionic wetters); and, where it is desired to produce a stable solution or suspension, it will generally be necessary to do some trial experiments to discover whether the ingredients are suitable for the purpose and in what proportions. Where a material in a formulation is found to precipitate from solution or settle out from a suspension on standing, it may be still possible to use such a formulation by making it up immediately before it is to be used, e.g. in the reservoir of a spraying machine.

The plant treatment compositions of our invention give particularly good results when sprayed or sprinkled from apparatus producing large droplets e.g. oscillating booms such as the 'Vibro boom', oscillating nozzles such as the 'Vibrajet' (trademark), or the rose of a watering can.

According to a further feature of the invention we provide novel wetter compositions useful in preparing plant treatment compositions according to our invention, said wetter compositions comprising; a wetting agent which is (a) an anionic wetter which is an alkyl or alkyl aryl sulphate or sulphonate, or (b) a nonionic wetter which is a condensate of ethylene oxide or propylene oxide with an alkyl phenol or an amine; an aliphatic compound having the molecular formula:

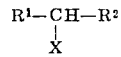

where —X is —OH, —COOH, —NH$_2$, —CONH$_2$ or —O·CO·H; R$^1$ is a straight chain alkyl or alkoxyalkyl group having from four to 11 carbon atoms; R$^2$ is hydrogen or a straight chain alkyl or alkoxyalkyl group having from three to five carbon atoms and the total number of carbon atoms in the molecule is from 8 to 12 inclusive; and, optionally, water.

In the wetter compositions of the invention the proportion by weight of the aliphatic compound to the wetting agent is preferably within the range 0.1 to 2. Preferably the aliphatic compound is a primary alcohol, particularly n-nonan-1-ol, and preferably the wetting agent is a condensate of ethylene oxide or propylene oxide with an alkyl phenol. The wetter compositions of the invention may be formulated as free-flowing powders by admixture with a finely divided solid mineral diluent, the amount of the latter being conveniently from 30 to 65 percent by weight of the composition. Such compositions may conveniently be made by dissolving the wetting agent and the aliphatic compound in a volatile solvent, e.g. acetone, adding the finely divided solid mineral diluent and thereafter removing substantially all the volatile solvent by evaporation. Solid compositions of this type readily release the wetting agent and the aliphatic compound when diluted with water.

The following examples illustrate the remarkable improvement in wetting properties which is obtainable using the wetter compositions of our inventions; hereafter all concentrations are by weight unless otherwise stated.

EXAMPLES 1–3

Three solutions containing the same solar concentration of three different aliphatic compounds and 0.1 percent of 'LISSAPOL' NX were made up together with a control solution containing 0.1 percent 'LISSAPOL' NX only. The solutions were tested for spreading properties by placing drops from a capillary tube on leaves of fat-hen (*chenopodium album*) and observing the effect. Results are shown in Table 1 below.

'LISSAPOL' NX is a condensate of one mole of nonyl phenol with eight moles of ethylene oxide.

TABLE 1.

| Example | Aliphatic Compound | Concentration | Spreading on a fat-hen |
|---|---|---|---|
| Control | Nil | — | Slight spread |
| 1 | n-octanoic acid | 0.10% | Large spread |
| 2 | n-Decan-1-ol | 0.11% | Large spread |
| 3 | Di-n-amyl acetic acid | 0.14% | Large spread |

EXAMPLES 4–36

The procedure of Examples 1 to 3 was followed in testing the spreading properties of a variety of solutions containing different wetters and additives on three different types of leaf; maize (*Zea mais*) fat-hen (*Chenopodium album*) and cabbage (*Brassica oleracea*). The leaves of each of these three plants are difficult to wet. Results are shown in Tables II to VII below. In each case the degree of spread obtained was visually assessed and given a marking on a scale between 1.0 (no spread) and 10.0 (complete spreading). Control experiments are indicated by letters.

'LUBROL' E is a condensate of one mole of octylphenol with seven molar proportions of ethylene oxide.

'LUBROL' L is a condensate of 1 mole of nonyl phenol with 13 molar proportions of ethylene oxide.

'LUBROL' W is a condensate of a mixture of oleyl and cetyl alcohols with 17 molar proportions of ethylene oxide.

When 1 percent by weight paraquat dichloride was added to the formulations of Examples 4 to 36 to give herbicidal compositions, it was found that the wetting and spreading properties of the formulations remained unchanged.

TABLE II

| Experiment | Surfactant | Conc. of n-octanoic acid, percent | Maize Comments | Maize Spreading assessment | Fat-hen Comments | Fat-hen Spreading assessment | Cabbage Comments | Cabbage Spreading assessment |
|---|---|---|---|---|---|---|---|---|
| B | Lissapol[1] | 0.00 | Wetting but no spread | 1.0 | Wetting, slight spread | 2.0 | Good wetting, almost no spread | 1.5 |
| 4 | | 0.05 | Spreading along veins | 2.0 | Rapid spreading | 9.5 | Spreading along veins | 5.0 |
| 5 | | 0.09 | Spreading quickly along and across veins. | 4.0 | Complete spreading | 10.0 | Rapid spreading along veins | 7.0 |
| 6 | | 0.13 | do | 5.0 | do | 10.0 | Rapid spreading along and across veins | 10.0 |
| 7 | | 0.17 | do | 4.5 | do | 10.0 | do | 10.0 |
| 8 | | 0.20 | Less spreading along veins | 3.0 | do | 10.0 | do | 10.0 |

[1] NX (0.1%).

TABLE III

| Experiment | Surfactant | Conc. of n-octan-1-ol, percent | Maize Comments | Maize Spreading assessment | Fat-hen Comments | Fat-hen Spreading assessment | Cabbage Comments | Cabbage Spreading assessment |
|---|---|---|---|---|---|---|---|---|
| C | Lissapol[1] | 0.00 | Wetting, no spread | 1.0 | Wetting slight spread | 2.0 | Good wetting, virtually no spread | 1.5 |
| 9 | | 0.01 | do | 1.0 | Marked spreading | 6.0 | Good wetting, almost no spread | 1.5 |
| 10 | | 0.05 | Spreading quickly along veins. | 3.0 | Rapid spreading | 10.0 | Rapid spreading along veins | 7.0 |
| 11 | | 0.09 | Spreading quickly along and across veins. | 6.5 | do | 10.0 | Rapid spreading along and across veins. | 10.0 |
| 12 | | 0.13 | do | 6.0 | do | 10.0 | do | 10.0 |
| 13 | | 0.17 | do | 7.0 | do | 10.0 | do | 10.0 |
| 14 | | 0.20 | Spreads slowly along and across veins. | 5.0 | do | 10.0 | do | 10.0 |

[1] NX (0.1%).

TABLE IV

| Experiment | Surfactant | Conc. of 2-n-octyloxy ethanol, percent | Maize Comments | Maize Spreading assessment | Fat-hen Comments | Fat-hen Spreading assessment | Cabbage Comments | Cabbage Spreading assessment |
|---|---|---|---|---|---|---|---|---|
| D | Lissapol[1] | 0.00 | Wetting but no spread | 1.0 | Slight spread | 2.0 | Good wetting, no spread | 1.5 |
| 15 | | 0.01 | do | 1.0 | Marked spreading | 5.0 | Good wetting, almost no spread | 1.5 |
| 16 | | 0.05 | Spreading quickly along veins | 3.5 | Rapid spreading | 10.0 | Marked spreading along veins | 7.0 |
| 17 | | 0.09 | Spreading quickly along and across veins | 7.0 | do | 10.0 | do | 7.0 |
| 18 | | 0.13 | do | 7.0 | do | 10.0 | Spreading along and across veins | 10.0 |
| 19 | | 0.17 | Less spread but along and across veins | 5.5 | do | 10.0 | do | 10.0 |
| 20 | | 0.20 | Very little spreading across veins. | 5.0 | do | 10.0 | do | 10.0 |

[1] NX (0.1%).

TABLE V

| Experiment | Surfactant | Conc. of n-octanoic acid, percent | Maize Comments | Maize Spreading assessment | Fat-hen Comments | Fat-hen Spreading assessment | Cabbage Comments | Cabbage Spreading assessment |
|---|---|---|---|---|---|---|---|---|
| E | Lubrol E[1] | 0.00 | Very slight spreading | 1.5 | | | Good wetting almost no spread | 1.5 |
| 21 | | 0.01 | do | 1.5 | Slow but marked spreading. | 6.0 | Good wetting slight spread | 2.5 |
| 22 | | 0.05 | Marked spreading along veins. | 3.5 | Rapid spreading | 10.0 | Spreading along veins | 7.0 |
| 23 | | 0.09 | Spreading quickly along and across veins | 6.5 | do | 10.0 | Rapid spreading along veins | 8.0 |
| 24 | | 0.13 | do | 7.0 | do | 10.0 | Rapid spreading along and across veins. | 10.0 |
| 25 | | 0.17 | do | 6.5 | do | 10.0 | do | 10.0 |
| 26 | | 0.20 | do | 7.0 | do | 10.0 | do | 10.0 |

[1] 0.1%.

TABLE VI

| Experiment | Surfactant | Conc. of 2-n-octyloxy ethanol, percent | Maize Comments | Maize Spreading Assessment | Fat-hen Comments | Fat-hen Spreading assessment | Cabbage Comments | Cabbage Spreading assessment |
|---|---|---|---|---|---|---|---|---|
| F | Lubrol L[1] | 0.00 | Wetting, no spread | 1.0 | Wetting, no spread | 1.0 | Wetting, no spread | 1.0 |
| 27 | | 0.05 | do | 1.0 | Wetting, almost no spread. | 1.5 | Good wetting, almost no spread. | 1.5 |
| 28 | | 0.09 | Slight spread along veins | 2.5 | Spreading almost completely. | 8.0 | Rapid spreading along veins | 10.0 |
| 29 | | 0.13 | Slow spreading along and across veins. | 4.0 | Complete spreading | 10.0 | Rapid spreading along and across veins. | 10.0 |
| 30 | | 0.17 | do | 5.0 | do | 10.0 | do | 10.0 |
| 31 | | 0.20 | do | 6.0 | do | 10.0 | do | 10.0 |

[1] 0.1%

TABLE VII

| Experiment | Surfactant | Conc. of 2-n-octyloxy-ethanol, percent | Maize Comments | Maize Spreading assessment | Fat-hen Comments | Fat-hen Spreading assessment | Cabbage Comments | Cabbage Spreading assessment |
|---|---|---|---|---|---|---|---|---|
| G | LUBROL W [1] | 0.00 | Very poor wetting | 0.3 | Very poor wetting | 0.1 | Poor wetting | 0.8 |
| 32 | | 0.05 | Poor wetting | 0.5 | Slightly better wetting | 0.5 | Wetting, no spread | 1.0 |
| 33 | | 0.09 | do | 0.5 | do | 1.0 | Wetting, almost no spread | 1.5 |
| 34 | | 0.13 | Slight spread along veins | 1.5 | Slight spreading | 3.0 | Slight spread | 2.5 |
| 35 | | 0.17 | do | 2.0 | Spreading slowly | 5.0 | do | 2.5 |
| 36 | | 0.20 | do | 1.5 | do | 7.0 | Better spreading along veins | 5.0 |

[1] 0.1%.

The following examples illustrate plant treatment compositions according to our invention; percentages are by weight unless otherwise stated.

EXAMPLES 37–45

'GRAMOXONE' (Trade Mark of Imperial Chemical Industries Limited), an aqueous solution containing 27.6 percent paraquat dichloride, was diluted with water to 1 percent by volume and 0.05 percent 'LISSAPOL' NX was added. Test solutions containing various concentrations of n-octan-1-ol were made up and tested for wetting and spreading properties on maize, fat-hen and cabbage. The procedure of Examples 1 to 36 was followed, and the results were recorded in the same way. They are set out in Table VIII below.

TABLE VIII

| Example | 37 | 38 | 39 | 40 | 41 | 42 | 43 | 44 | 45 |
|---|---|---|---|---|---|---|---|---|---|
| Percent n-octan-1-ol | 0.02 | 0.03 | 0.04 | 0.05 | 0.06 | 0.07 | 0.08 | 0.09 | 0.10 |
| Fat Hen | 2 | 5 | 6 | 7 | 8 | 9 | 10 | 10 | 10 |
| Cabbage | 3 | 5 | 6 | 5 | 5 | 5 | 5 | 6 | 5 |
| Maize | 3 | 4 | 5 | 4 | 4 | 7 | 7 | 7 | 6 |

TABLE IX

| Example | 46 | 47 | 48 | 49 | 50 | 51 | 52 | 53 | 54 | 55 |
|---|---|---|---|---|---|---|---|---|---|---|
| Percent n-octan-1-ol | 0.01 | 0.02 | 0.03 | 0.04 | 0.05 | 0.06 | 0.07 | 0.08 | 0.09 | 0.10 |
| Fat Hen | 2 | 3 | 3 | 5 | 6 | 7 | 9 | 10 | 10 | 9 | 10 |
| Cabbage | 2 | 3 | 3 | 3 | 4 | 4 | 5 | 5 | 5 | 5 |
| Maize | 2 | 3 | 3 | 3 | 4 | 4 | 5 | 5 | 6 | 5 |

EXAMPLES 46–55

'PERENOX' (I.C.I. trademark), a wettable powder containing 50 percent copper in the form of finely divided curpous oxide, was suspended in water at a concentration of 15 grams per liter and 0.05 percent 'LISSAPOL' NX was added. Solutions containing varying amounts of n-octan-1-ol were tested as in Examples 37–45. Results are shown in Table IX above.

EXAMPLE 56

A wetter composition was made up having the following constitution:

| | |
|---|---|
| 'LISSAPOL' NX | 60% |
| n-nonan-1-ol (technical) | 40% |

EXAMPLE 57

A plant treatment composition having the following constitution was prepared:

| | |
|---|---|
| Aerial 'PERENOX' | 80% |
| Silica Filler, K 320 (Surface area 230 square meters/gram) | 7.5% |
| Wetter composition of Example 56 | 12.5% |

The Aerial 'PERENOX' and silica filler were mixed on a roller mill. The wetter composition was dissolved in acetone and the solution thus formed was slurried with the solid constituents. The slurry was then spray dried to give a free-flowing powder.

Aerial 'PERENOX' is a product similar to 'PERENOX' but contains reduced amounts of salt (NaCl) and is thus less corrosive.

EXAMPLE 58

A free-flowing solid wetter composition was prepared from the following constituents.

| | |
|---|---|
| 'GASIL' 23 (silica filler of surface area 300 square meters/gram) | 45% |
| n-nonan-1-ol (technical) | 22% |
| 'LISSAPOL' NX | 33% |

The composition was prepared by dissolving the 'LISSAPOL' and the n-nonan-1ol in acetone, adding the 'GASIL' and spray-drying the resulting slurry. The composition was readily dispersed in water, giving an effective wetting action.

EXAMPLE 59

A wetter composition was made by the method of Example 59 from the following constituents:

| | |
|---|---|
| Silica K.320 | 50% |
| n-nonan-1-ol | 20% |
| 'LISSAPOL' NX | 30% |

EXAMPLE 60

Greenhouse-reared fat-hen plants (*Chenopodium album*) were taken out-of-doors and sprayed using a 'VIBRAJET' oscillating spray nozzle ('VIBRAJET' is an I.C.I. trademark). Similarly sized plants were divided between treatments to give six replicates. Paraquat ion (in the form of paraquat dichloride) was mixed with water at a rate of 1 lb ion per 100 gallons, and wetter compositions added to give a wetter composition concentration of 0.1 percent. The plants were sprayed at a rate of 20 gallons/acre, replaced in the greenhouse and assessed seven days later by experienced operators. Each plant was awarded a score on a scale between 0 (representing "no effect") and 20 (representing "complete kill"). Results are shown in Table X below.

TABLE X.

| Wetting Composition | Kill Score of Each Plant | Total |
|---|---|---|
| 'LISSOPOL' NX | 0 0 0 0 0 0 | 0 |
| 'CETAVLON' | ½ 0 0 0 0 0 | ½ |
| 'LISSAPOL' NX (60%) + n-octan-1-ol (40%) | 6 6 6 7 5 5 | 35 |
| The wetter composition of Example 56 | 7 6 5 6 7 5 | 36 |

'CETAVLON' is the trademark for a cationic wetter comprising a long-chain alkyl quaternary ammonium compound.

EXAMPLE 61

A stubble field, infested with weeds, was divided into 3 strips, A, B and C. Strips A and B were sprayed with a standard 'GRAMOXONE' solution containing 0.16 percent of a wetting agent consisting 'LISSAPOL' NX. Strip C was sprayed with a formulation containing paraquat dichloride and 0.16 percent of a mixture of equal parts 'LISSAPOL' NX and caprylic acid. A standard spraying machine was used for strip A; this gave rise to fine spray droplets giving good coverage but with a considerable tendency to mist and drift. For strips B and C an oscillating boom sprayer (trademark 'VIBROBOOM' was used; this produced coarser droplets, eliminating drift but not giving quite such good spray coverage. In all trials the concentration of paraquat ion was 1 lb per 40 gallons and the spray was applied at a rate of 20 gallons per acre.

Assessment of the results twelve days after spraying indicated the following.

Strip A: Kill of weeds unsatisfactory; some regrowth
Strip B: Kill of weeds poor; much regrowth
Strip C: Complete dessication of weeds: no regrowth evident.

We claim:

1. A plant treatment composition substantially free of organic liquid diluent, comprising:
   1. a plant treatment chemical;
   2. a wetting agent selected from
      a. anionic wetters which are alkyl or alkyl aryl sulphates or sulphonates
      b. nonionic wetters which are condensates of ethylene or propylene oxide with alcohols, amines or alkyl phenols; and
   3. an aliphatic compound different from (1) and (2) and having the molecular formula:

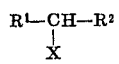

where X is —OH;
   $R^1$ is a straight chain alkyl or alkoxyalkyl group having from four to 11 carbon atoms;
   $R^2$ is hydrogen or a straight chain alkyl or alkoxyalkyl group having from three to five carbon atoms and the total number of carbon atoms in the molecule is from 8 to 12 inclusive, the proportion by weight of the aliphatic compound to the wetter being within the range 0.1 to 2.

2. A plant treatment composition substantially free of organic liquid diluent, comprising:
   1. a plant treatment chemical;
   2. a wetting agent selected from
      a. anionic wetters which are alkyl or alkyl aryl sulphates or sulphonates
      b. nonionic wetters which are condensates of ethylene or propylene oxide with alcohols, amines or alkyl phenols; and
   3. an aliphatic compound different from (1) and (2) and having the molecular formula:

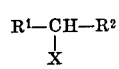

where X is —OH;
   $R^1$ is a straight chain alkyl or alkoxyalkyl group having from four to 11 carbon atoms;
   $R^2$ is hydrogen or a straight chain alkyl or alkoxyalkyl group having from three to five carbon atoms and the total number of carbon atoms in the molecule is from 8 to 12 inclusive, said composition comprising 0.05–0.5 parts by weight of aliphatic compound, 0.05–0.5 parts by weight of wetter and 0.1–1 parts by weight of plant treatment chemical.

3. A composition according to claim 2 which also contains water.

4. A composition according to claim 2 in which the wetting agent is a non-ionic wetter.

5. A composition according to claim 2 in which $R_2$ in the molecular formula of the aliphatic compound is hydrogen or the same as $R_1$.

6. A composition according to claim 5 in which the aliphatic compound is a primary alcohol.

7. A composition according to claim 6 in which the primary alcohol is n-octanol, n-nonanol or n-decanol.

8. A composition according to claim 2 which is solid and comprises a finely divided solid diluent.

9. A wetter composition suitable for use in preparing plant treatment compositions according to claim 2, said wetter composition comprising:
   a. an anionic wetter which is an alkyl or alkylaryl sulphate or sulphonate, or
   b. a nonionic wetter which is a condensate of ethylene oxide or propylene oxide with an alkylphenol or an amine; and
   an aliphatic compound having the molecular formula:

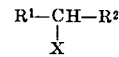

where X is —OH;
   $R^1$ is a straight chain alkyl or alkoxyalkyl group having from four to 11 carbon atoms;
   $R^2$ is hydrogen or a straight chain alkyl or alkoxyalkyl group having from three to five carbon atoms and the total number of carbon atoms in the molecule is from 8 to 12 inclusive.

10. A composition according to claim 9 in which the proportion by weight of the aliphatic compound to the wetting agent is from 0.1 to 2.

11. A composition according to claim 9 in which the aliphatic compound is a primary alcohol.

12. A composition according to claim 11 in which the aliphatic compound is n-nonan-1-ol.

13. A composition according to claim 11 in which the wetting agent is a condensate of ethylene oxide or propylene oxide with an alkyl phenol.

14. A composition according to claim 9 which also comprises a finely divided solid mineral diluent.

15. A composition according to claim 14 wherein the amount of mineral diluent in the composition is from 30 to 65 percent by weight of the composition.

16. A process for making a composition according to claim 14 which comprises dissolving the wetting agent and the aliphatic compound in a volatile solvent, adding the finely divided solid mineral diluent and thereafter removing substantially all the volatile solvent by evaporation.

17. In a process for treating plants which comprises applying a plant treatment chemical thereto, the improvement whereby better wetting of the plants with said chemical is obtained, said improvement comprising applying the plant treatment chemical to said plants as a composition which is substantially free of organic liquid diluent and comprising:
   1. the plant treatment chemical;
   2. a wetting agent selected from
      a. anionic wetters which are alkyl or alkyl aryl sulphates or sulphonates
      b. nonionic wetters which are condensates of ethylene or propylene oxide with alcohols, amines or alkyl phenols; and
   3. an aliphatic compound different from (1) and (2) and having the molecular formula:

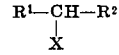

where X is —OH;
   $R^1$ is a straight chain alkyl or alkoxyalkyl group having from four to 11 carbon atoms;
   $R^2$ is hydrogen or a straight chain alkyl or alkoxyalkyl group having from three to five carbon atoms and the total number of carbon atoms in the molecule is from 8 to 12 inclusive.

* * * * *